(12) United States Patent
Mao et al.

(10) Patent No.: US 6,396,668 B1
(45) Date of Patent: May 28, 2002

(54) PLANAR DOUBLE SPIN VALVE READ HEAD

(75) Inventors: Sining Mao, Savage; Dian Song, Eden Prairie, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 44 days.

(21) Appl. No.: 09/621,849

(22) Filed: Jul. 24, 2000

Related U.S. Application Data

(60) Provisional application No. 60/191,818, filed on Mar. 24, 2000.

(51) Int. Cl.⁷ .................................................. G11B 5/39
(52) U.S. Cl. ..................................... 360/314; 360/324.1
(58) Field of Search .............................. 360/314, 324.1, 360/324.11, 324.12

(56) References Cited

U.S. PATENT DOCUMENTS

| | | | |
|---|---|---|---|
| 4,103,315 A | 7/1978 | Hempstead et al. | 360/110 |
| 4,436,593 A | 3/1984 | Osborne et al. | 204/15 |
| 4,663,685 A | 5/1987 | Tsang | 360/113 |
| 4,713,708 A | 12/1987 | Krounbi et al. | 360/113 |
| 4,785,366 A | 11/1988 | Krounbi et al. | 360/113 |
| 5,206,590 A | 4/1993 | Dieny et al. | 324/252 |
| 5,251,170 A | 10/1993 | Daughton et al. | 365/158 |
| 5,390,061 A | 2/1995 | Nakatami et al. | 360/113 |
| 5,420,819 A | 5/1995 | Pohm | 365/158 |
| 5,446,613 A | 8/1995 | Rottmayer | 360/113 |
| 5,578,342 A | 11/1996 | Tran et al. | 427/131 |
| 5,583,725 A | 12/1996 | Coffey et al. | 360/113 |
| 5,668,686 A * | 9/1997 | Shouji et al. | 360/319 |
| 5,668,688 A | 9/1997 | Dykes et al. | 360/113 |
| 5,729,410 A | 3/1998 | Fontana, Jr. et al. | 360/113 |
| 5,753,131 A | 5/1998 | Chouk et al. | 216/22 |
| 5,756,366 A | 5/1998 | Berg et al. | 437/48 |
| 5,768,069 A * | 6/1998 | Mauri | 360/314 |
| 5,804,085 A | 9/1998 | Wu et al. | 216/22 |
| 5,863,448 A | 1/1999 | Otani et al. | 216/22 |
| 5,867,889 A | 2/1999 | Dovek et al. | 29/603.13 |
| 5,880,910 A | 3/1999 | Shouji et al. | 360/113 |
| 5,901,432 A | 5/1999 | Armstrong et al. | 29/603.14 |
| 5,923,503 A * | 7/1999 | Sato et al. | 360/327 |
| 5,949,623 A | 9/1999 | Lin | 360/113 |
| 6,118,638 A * | 9/2000 | Knappet al. | 360/314 |
| 6,134,091 A * | 10/2000 | Toki et al. | 360/324.11 |

OTHER PUBLICATIONS

U.S. application No. 09/442,798, Magnetic Sensor Stabilization, filed Nov. 18, 1999.

(List continued on next page.)

*Primary Examiner*—David L. Ometz
(74) *Attorney, Agent, or Firm*—Kinney & Lange, P.A.

(57) ABSTRACT

A planar spin valve read head comprises a top and a bottom shield, and a first and a second gap layer. The first gap layer is positioned adjacent to the bottom shield. The second gap layer is positioned adjacent to the top shield. The read head includes a planar sensor structure positioned between the first and the second gap layers for sensing a magnetic field from a magnetic medium.

22 Claims, 6 Drawing Sheets

OTHER PUBLICATIONS

U.S. application No. 09/442,798, Single Antiferrogmagnetic Material, filed Feb. 8, 2000.

U.S. application No. 09/442,798, Spin Tunnel Junction Recording Heads Using An Edge Junction Structure, filed Feb. 8, 2000.

W. F. Engelhoff, Jr., et al., "Specular Electron Scattering in Giant Magnetoresistance Spin Valves", IEEE Transactions on Magnetics, vol. 33, No. 5, Sep. 1997, 3 pages.

J.C.S. Kools, et al., "Process monitoring of spin–valve GMR deposition", IEEE Transactions on Magnetics, vol. 34, No. 4, Jul. 1999, 3 pages.

H.J.M. Swagten, et al., "Specular Reflection in Spin Valves Bounded by NiO layers", IEEE Transactions on Magnetics, vol. 34, No. 4, Jul. 1999, 6 pages.

C. Tsang, "Unshielded MR elements with patterned exchange–biasing", IEEE Transaction on Magnetics, vol. 25 (5), pp. 3692–3694 (1989).

Juan J. Fernandez–de–Castro, et al., "Permanent Magnet Stabilization of an Overlaid MR Head", IEEE Transactions on Magnetics, Intermag '96.

Magnetoresistive heads by John Mallinson, Academic Press, London (1996).

Sining Mao, et al., "NiMn–pinned spin valves with high pinning field made by ion beam sputtering", Appl. Phys Lett. 69, 2593 (1996).

Intermag '96, IEEE Transactions on Magnetics.

Taras Pokhl, Sining Mao, and Anthony Mack, "Study of exchange anisotrophy in NiFe/Ni/Mn and NiFe/IrMn exchange coupled films", J. Appl. Phys. 85, 4916 (1999).

A. Pohm, et al., "Narrow, End–on, GMR Read–Head Sensors", Digest of the International Conference on Magnetics (Intermag), AA–06, Apr. 1996.

J.M. Daughton, "Weakly Coupled GMR Sandwiches", IEEE Trans. Magn. 30, 364 (1994).

R. Rottmayer, et al., "A New Design For An Ultra–High Density Magnetic Recording Head Using A GMR Sensor in The CCP Mode", IEEE Tran. Magn. 31, 2597 (1995).

T. Lin et al., "Exchange–Coupled Ni–Fe/Fe–Mn, Ni–Fe/Ni–Mn and NiO/Ni–Fe Films for Stabilization of Magnetoresistive Sensors", IEEE Tran. Magn. 31, 2585 (1995).

S. Lee et al., "Current–perpendicular and current–parallel giant magnetoresistances in Co/Ag multilayers", Phys. Rev. 52, 426 (1995).

J. Gu et al., "Enhancing current–perpendicular magnetoresistance in Permalloy–based exchange–biased spin valves by increasing spin–memory loss", J. Appl. Phys. 87, 4831 (2000).

"Magnetic Recording Technology", McGraw–Hill, 1990, Ed. C. D. Mee et al., p. 2.13.

Z. Qian et al., "Magnetic behavior of NiFe/NiO bilayers", J. Appl. Phys. 83, 6825 (1998).

Y. Huai, MMM 99, "IrMn based spin–filter spin–valves", J. Appl. Phys. 87, 5741 (2000).

m. Gijs et al., "Temperature dependence of the spin–dependent scattering in Co/Cu multilayers determined from perpendicular–giant–magnetoresistance experiments", Phys. Rev. 50, 733 (1994).

* cited by examiner

PLANAR DOUBLE SPIN VALVE READ HEAD

CROSS-REFERENCE TO RELATED APPLICATION(S)

This application claims the benefit of the filing date of U.S. Provisional Application Ser. No. 60/191,818 entitled "Novel Recording Head Using Planer Double Spin Valves", which was filed Mar. 24, 2000.

BACKGROUND OF THE INVENTION

The present invention relates generally to magnetoresistive read sensors for use in magnetic read heads. In particular, the present invention relates to a planar double spin valve read head with narrow shield-to-shield spacing and enhanced giant magnetoresistance (GMR) effect.

A magnetic read head retrieves magnetically-encoded information that is stored on a magnetic medium or disc. The magnetic read head is typically formed of several layers that include a top shield, a bottom shield, and a read sensor positioned between the top and bottom shields. The read sensor is generally a type of magnetoresistive sensor, such as a GMR read sensor. The resistance of a GMR read sensor fluctuates in response to a magnetic field emanating from a magnetic medium when the GMR read sensor is used in a magnetic read head and positioned near the magnetic medium. By providing a sense current through the GMR read sensor, the resistance of the GMR read sensor can be measured and used by external circuitry to decipher the information stored on the magnetic medium.

A common GMR read sensor configuration is the GMR spin valve configuration in which the GMR read sensor is a multi-layered structure formed of a ferromagnetic free layer, a ferromagnetic pinned layer and a nonmagnetic spacer layer positioned between the free layer and the pinned layer. The magnetization direction of the pinned layer is fixed in a predetermined direction, generally normal to an air bearing surface of the GMR spin valve, while a magnetization direction of the free layer rotates freely in response to an external magnetic field. An easy axis of the free layer is generally set normal to the magnetization direction of the pinned layer. The resistance of the GMR read sensor varies as a function of an angle formed between the magnetization direction of the free layer and the magnetization direction of the pinned layer. This multi-layered spin valve configuration allows for a more pronounced magnetoresistive effect than is possible with anisotropic magnetoresistive (AMR) read sensors, which generally consist of a single ferromagnetic layer.

Typically, the magnetization of the pinned layer is fixed in the predetermined direction by exchange coupling an antiferromagnetic layer to the pinned layer. The antiferromagnetic layer is positioned upon the pinned layer such that the antiferromagnetic layer and the free layer form distal edges of the GMR spin valve. The spin valve is then heated to a temperature greater than a Néel. temperature of the antiferromagnetic layer. Next, a magnetic field oriented in the predetermined direction is applied to the spin valve, thereby causing the magnetization direction of the pinned layer to orient in the direction of the applied magnetic field. The magnetic field may be applied to the spin valve before the spin valve is heated to the temperature greater than the Néel temperature of the antiferromagnetic layer. While continuing to apply the magnetic field, the spin valve is cooled to a temperature lower than the Néel temperature of the antiferromagnetic layer. Once the magnetic field is removed from the spin valve, the magnetization direction of the pinned layer will remain fixed, as a result of the exchange with the antiferromagnetic layer, so long as the temperature of the spin valve remains lower than the Néel temperature of the antiferromagnetic layer.

The magnetic shields of a GMR read head block stray fields from the magnetic medium, and thereby allow for an increase in the on-track spatial resolution (i.e., linear density), typically measured in bits per inch or BPI. The shield-to-shield spacing limits the linear density of a high density head.

The gap layers, which are positioned between the shields, must be maintained at an appropriate thickness to ensure proper isolation. Therefore, there is a limit to the amount the shield-to-shield spacing can be reduced by reducing the thickness of the gap layers. By reducing the sensor thickness, the shield-to-shield spacing may be further reduced.

Existing spin valves have a vertical structure in which the various layers are stacked vertically between the shields. By stacking all of the layers of the spin valve on top of each other between the shields, the shield-to-shield spacing can, only be made as narrow as the entire spin valve stack (plus the gap layers). It would be desirable to use a planar spin valve wherein less than all of the layers of the spin valve stack are positioned between the shields in a central region of the head. Such a spin valve read head would provide a reduced shield-to-shield spacing since the shields would be separated by only one or two layers of the spin valve stack, rather than all of the layers of the stack.

It would also be desirable to increase the GMR effect by using a double spin valve structure operating in a current perpendicular to plane mode or CPP mode.

BRIEF SUMMARY OF THE INVENTION

A planar spin valve read head comprises a top and a bottom shield, and a first and a second gap layer. The first gap layer is positioned adjacent to the bottom shield. The second gap layer is positioned adjacent to the top shield. The read head includes planar sensor means positioned between the first and the second gap layers for sensing a magnetic field from a magnetic medium.

In a preferred embodiment, the planar sensor means comprises a first and a second planar spin valve, which share a common free layer and operate in a current perpendicular to plane (CPP) mode. The planar spin valve read head of the present invention provides a reduced shield-to-shield spacing to accommodate high linear densities, as well as an enhanced GMR effect.

DETAILED DESCRIPTION

Figure 1:
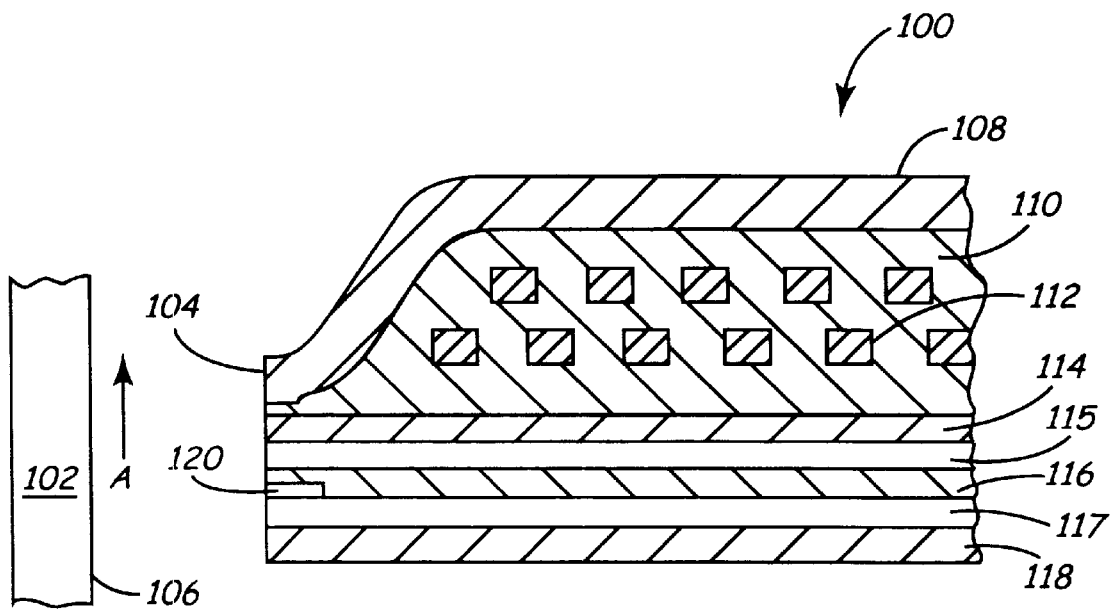
FIG. 1 is a cross-sectional view of a magnetic read/write head and magnetic disc taken along a plane normal to an air bearing surface of the read/write head.

FIG. 1 is a cross-sectional view of magnetic read/write head 100 and magnetic disc 102 taken along a plane normal to air bearing surface 104 of read/write head 100. Air bearing surface 104 of magnetic read/write head 100 faces disc surface 106 of magnetic disc 102. Magnetic disc 102 travels or rotates in a direction relative to magnetic read/write head 100 as indicated by arrow A. Spacing between air bearing surface 104 and disc surface 106 is preferably minimized while avoiding contact between magnetic read/write head 100 and magnetic disc 102.

A writer portion of magnetic read/write head 100 includes top pole 108, insulator layer 110, conductive coils 112 and top shield 114. Conductive coils 112 are held in place between top pole 108 and top shield 114 by use of insulator 110. Conductive coils 112 are shown in FIG. 1 as two layers of coils but may also be formed of more layers of coils as is well known in the field of magnetic read/write head design.

A reader portion of magnetic read/write head 100 includes top shield 114, top gap layer 115, metal contact layer 116, bottom gap layer 117, bottom shield 118, and giant magnetoresistive.(GMR) stack 120. Metal contact layer 116 is positioned between top gap layer 115 and bottom gap layer 117. GMR stack 120 is positioned between terminating ends of metal contact layer 116 and bottom gap layer 117. Top gap layer 115 is positioned between top shield 114 and metal contact layer 116. Bottom gap layer 117 is positioned between metal contact layer 116 and bottom shield 118. Top shield 114 functions both as a shield and as a shared pole for use in conjunction with top pole 108.

Figure 2:
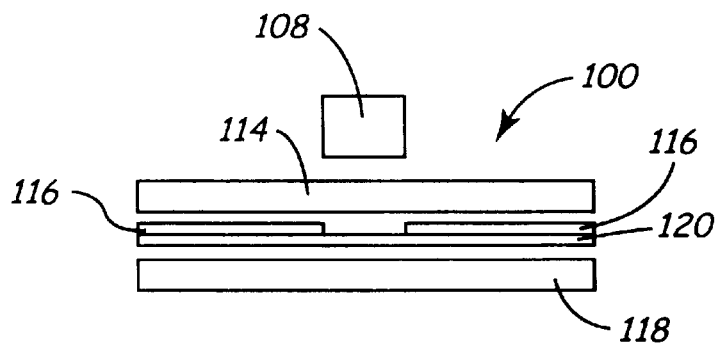
FIG. 2 is a layer diagram of an air bearing surface of a magnetic read/write head.

FIG. 2 is a layer diagram of air bearing surface 104 of magnetic read/write head 100. FIG. 2 illustrates the location of magnetically significant elements in magnetic read/write head 100 as they appear along air bearing surface 104 of magnetic read/write head 100 of FIG. 1. In FIG. 2, all spacing and insulating layers of magnetic read/write head 100 are omitted for clarity. Bottom shield 118 and top shield 114 are spaced to provide for a location of GMR stack 120. GMR stack 120 has two passive regions defined as the portions of GMR stack 120 adjacent to metal contact layer 116. An active region of GMR stack 120 is defined as the portion of GMR stack 120 located between the two passive regions of GMR stack 120. The active region of GMR stack 120 defines a read sensor width.

Figure 3:
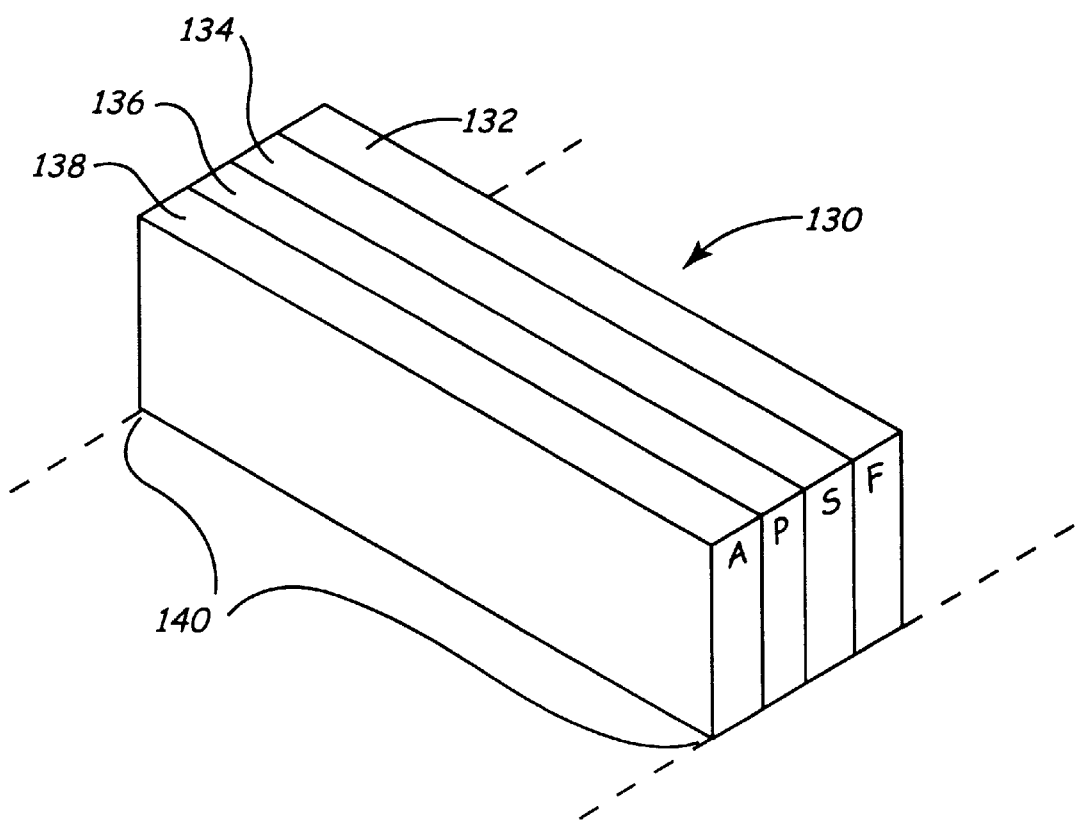
FIG. 3 is a perspective view of a prior art GMR stack.

FIG. 3 is a perspective view of a prior art GMR stack 130. GMR stack 130 has free layer 132, spacer layer 134, pinned layer 136, and antiferromagnetic layer 138. Spacer layer 134 is positioned between free layer 132 and pinned layer 136. A magnetization of pinned layer 136 is fixed in a predetermined direction, generally normal to air bearing surface 140 of GMR stack 130, while a magnetization of free layer 132 rotates freely in response to an external magnetic field (not shown in FIG. 3). Antiferromagnetic layer 138 is positioned on GMR stack 130 such that pinned layer 136 is between spacer layer 134 and antiferromagnetic layer 138. The magnetization of pinned layer 136 is pinned by exchange coupling pinned layer 136 with antiferromagnetic layer 138.

The resistance of GMR stack 130 varies as a function of an angle that is formed between the magnetization of pinned layer 136 and the magnetization of free layer 132. The magnetization of pinned layer 136 remains fixed in one direction, while the magnetization of free layer 132 rotates in response to a magnetic field emanating from a magnetic media or disc. The angle formed between the magnetization of free layer 132 and the magnetization of pinned layer 136 is, therefore, directly related to the magnetic field emanating from a magnetic media or disc. Consequently, the resistance of GMR stack 130 is directly related to the magnetic field emanating from the magnetic media or disc.

Figure 4:
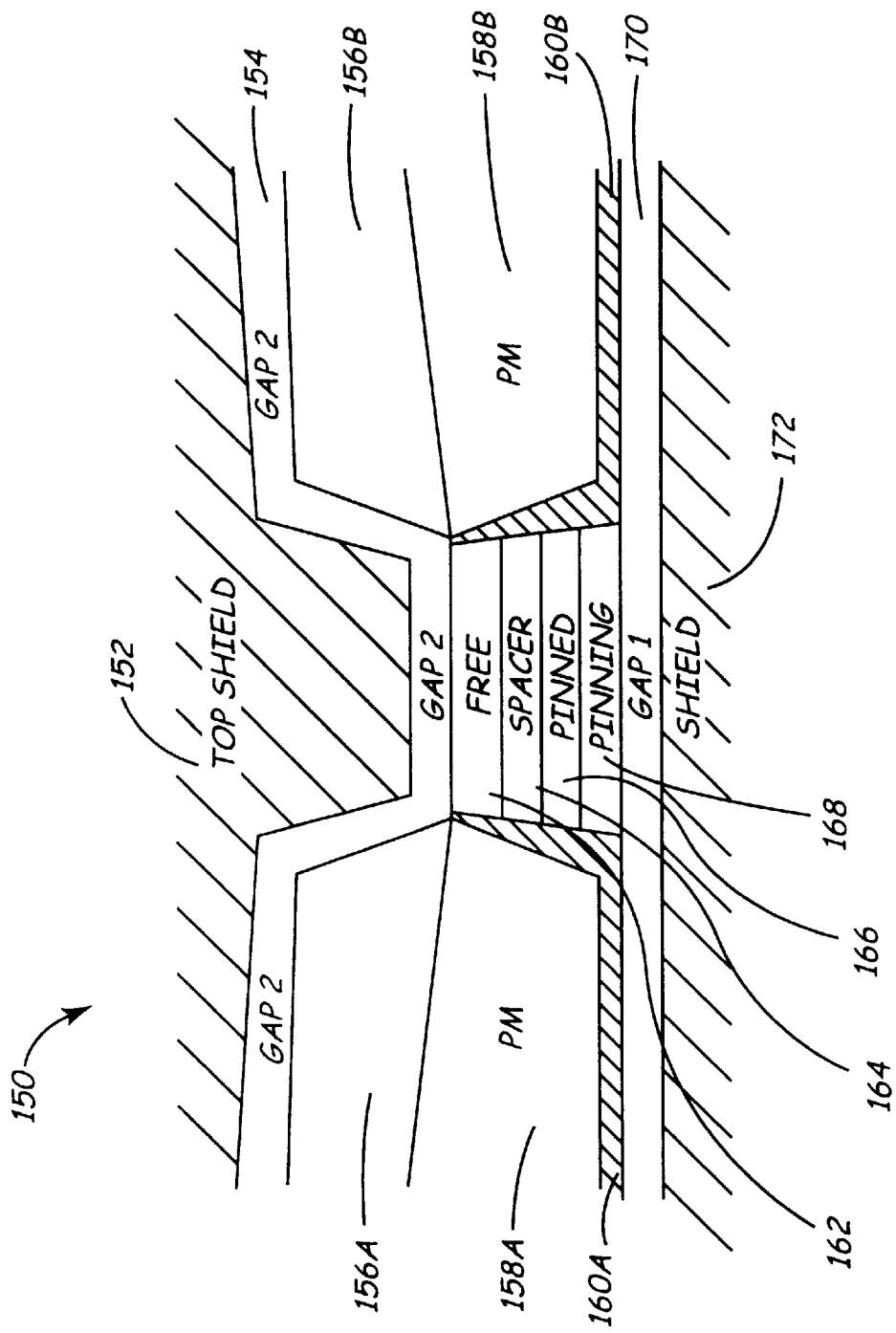
FIG. 4 shows a prior art spin valve head with a vertical stack configuration.

FIG. 4 shows a prior art spin valve head with a vertical stack configuration. Spin valve head 150 includes top shield 152, second gap layer 154, contact leads 156A and 156B, permanent magnet layers 158A and 158B, seed layers 160A and 160B, free layer 162, spacer layer 164, pinned layer 166, pinning layer 168, first gap layer 170 and bottom shield 172.

As can be seen in FIG. 4, free layer 162, spacer layer 164, pinned layer 166 and pinning layer 168 are positioned on top of each other in a vertical stack, with the entire stack positioned between top shield 152 and bottom shield 172. By stacking all of the layers of the spin valve stack on top of each other between shields 152 and 172, the shield-to-shield spacing can only be made as narrow as the entire spin valve stack (plus gap layers 154 and 170). Gap layers 154 and 170 are each typically about 200 Å thick. The sensor stack, comprising layers 162–168, is typically about 300 Å. The shield-to-shield spacing of spin valve head 150 is, therefore, about 700 Å.

Figure 5:
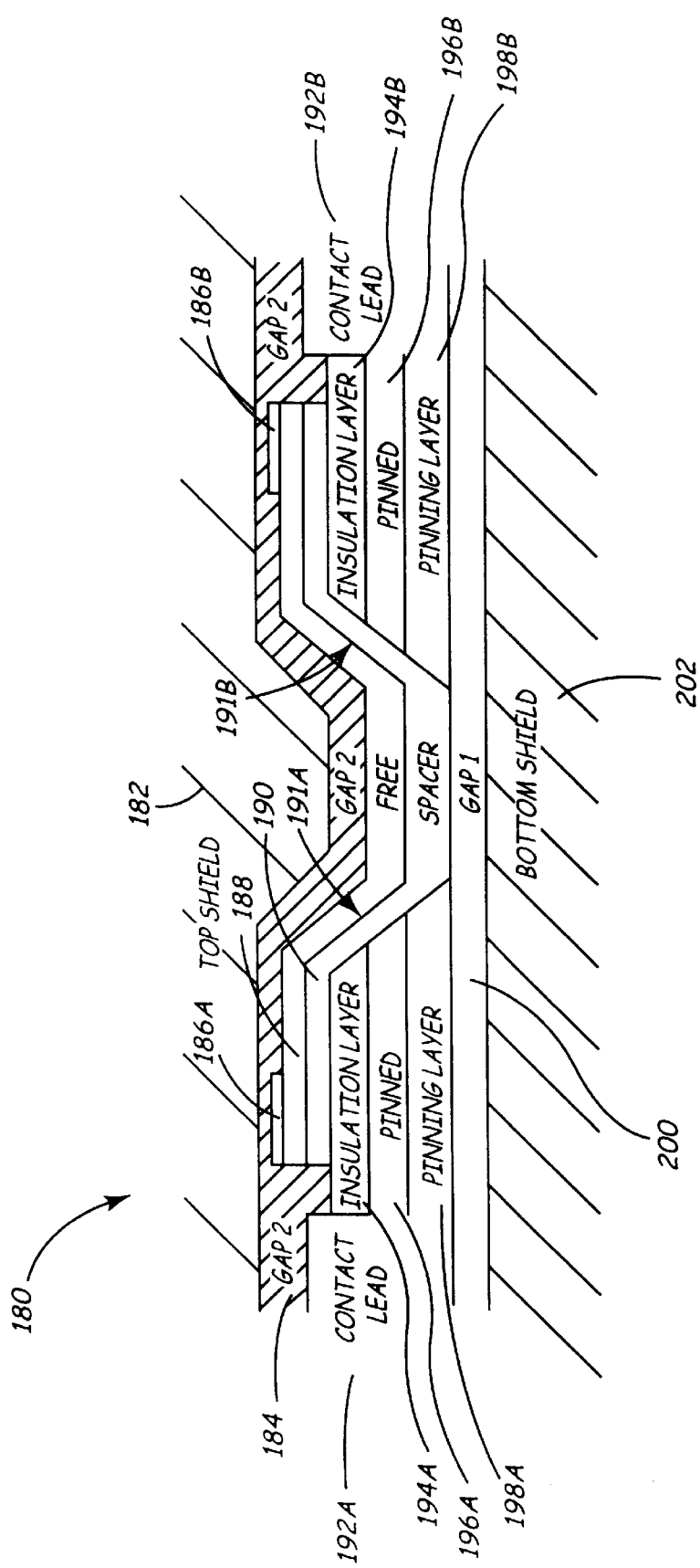
FIG. 5 shows a planar double spin valve head according to the present invention.

FIG. 5 shows a planar double spin valve head according to the present invention. Spin valve head 180 includes top shield 182, second gap layer 184, stabilization layers 186A and 186B, free layer 188, spacer layer 190, contact leads 192A and 192B, insulation layers 194A and 194B, pinned layers 196A and 196B, pinning layers 198A and 198B, first gap layer 200 and bottom shield 202. Top shield 182 also acts as a shared pole in a merged read/write head. Spacer layer 190 is preferably Cu. Insulation layers 194A and 194B are preferably alumina. Stabilization layers 186A and 186B stabilize of free layer 188. Stabilization layers 186A and 186B may be antiferromagnetic materials, such as IrMn, PtMn, or NiMn, exchange coupled to free layer 188, or alternatively may be permanent magnet hard bias layers.

Pinning layers 198A–198B, pinned layers 196A–196B and insulation layers 194A–194B are formed on top of first gap layer 200 and milled into the trench shape shown in FIG. 5. Spacer layer 190 is deposited over insulation layers 194A–194B and over first gap layer 200. A first portion 191A of spacer layer 190 is positioned adjacent and nearly perpendicular to insulation layer 194A, pinned layer 196A and pinning layer 198A. A second portion 191B of spacer layer 190 is positioned adjacent and nearly perpendicular to insulation layer 194B, pinned layer 196B and pinning layer 198B. Free layer 188 is deposited over spacer layer 190. Free layer 188 is preferably made into an elongated shape to take advantage of shape stabilization. With the elongated shape, free layer 188 includes outer regions that overlay pinned layers 196A–196B, rather than the first layer 188 being positioned entirely between layers 196A–196B and 198A–198B. Since pinned layers 196A and 196B are positioned beside free layer 188, rather than above or below free layer 188, there is no demagnetization field from pinned layers 196A and 196B which would adversely affect the bias point and free layer reversal of free layer 188.

A sense current flows between contact leads 192A and 192B in the plane of layers 196A–196B and 198A–198B. The current flows substantially perpendicular to portions 191A and 191B of spacer layer 190. This mode of operation, where the current flows perpendicular to the plane of the spacer layer, is referred to as current perpendicular to plane (CPP) mode. The GMR effect occurs at the interface between spacer layer 190 and free layer 188. Operation in CPP mode provides an improved GMR effect. Further improvement to the GMR effect is provided by the double spin valve structure of head 180, wherein two pinned layers 196A–196B and two pinning layers 198A–198B are separated by a common free layer 188, thereby forming two spin valves. With two free layer/spacer layer interfaces and current running perpendicular to the spacer layers, increased sensitivity is obtained.

Spin valve head 180 has a planar structure with a narrower shield-to-shield spacing than the prior art spin valve head shown in FIG. 4. As can be seen in FIG. 5, less than all of the layers of the spin valve stack are positioned between the shields in a central region of the head, which results in a reduced shield-to-shield spacing. In the embodiment shown, only free layer 188 and spacer layer 190 are positioned between shields 182 and 202 in a central region of head 180. With a thickness of 200 Å for each of gap layers 184 and 200, the shield-to-shield spacing of spin valve head 180 is about 430 Å.

Figure 6:
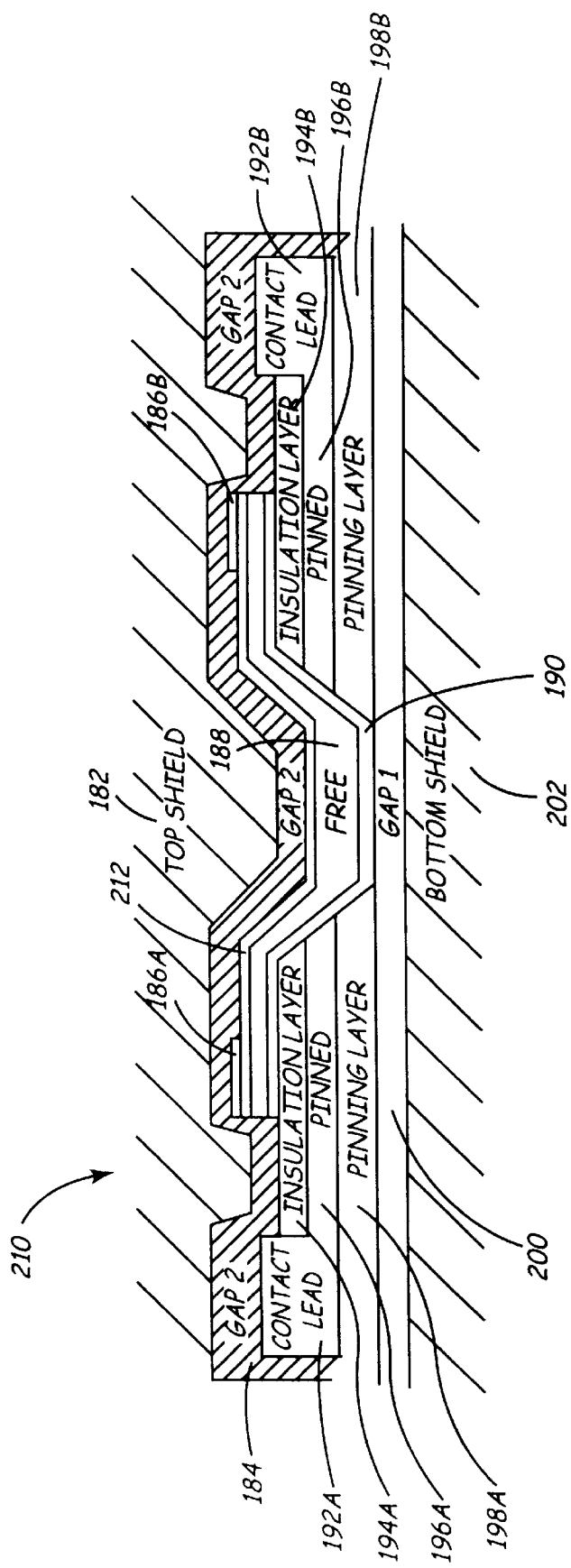
FIG. 6 shows a planar double spin valve head according to the present invention, with a current compensation layer.

FIG. 6 shows a planar double spin valve head according to the present invention, with a current compensation layer. Spin valve head 210 is substantially the same as spin valve head 180 shown in FIG. 5, but further includes current compensation layer 212 formed on free layer 188. Current compensation layer 212 is preferably Cu. Current compensation layer 212 provides bias point optimization of free layer 188. Current compensation layer 212 preferably has the same dimensions as spacer layer 190, so that the current-induced field from these layers will be balanced. With matched layers above and below free layer 188, the bias point of free layer 188 should be perfect in principle.

Figure 7:
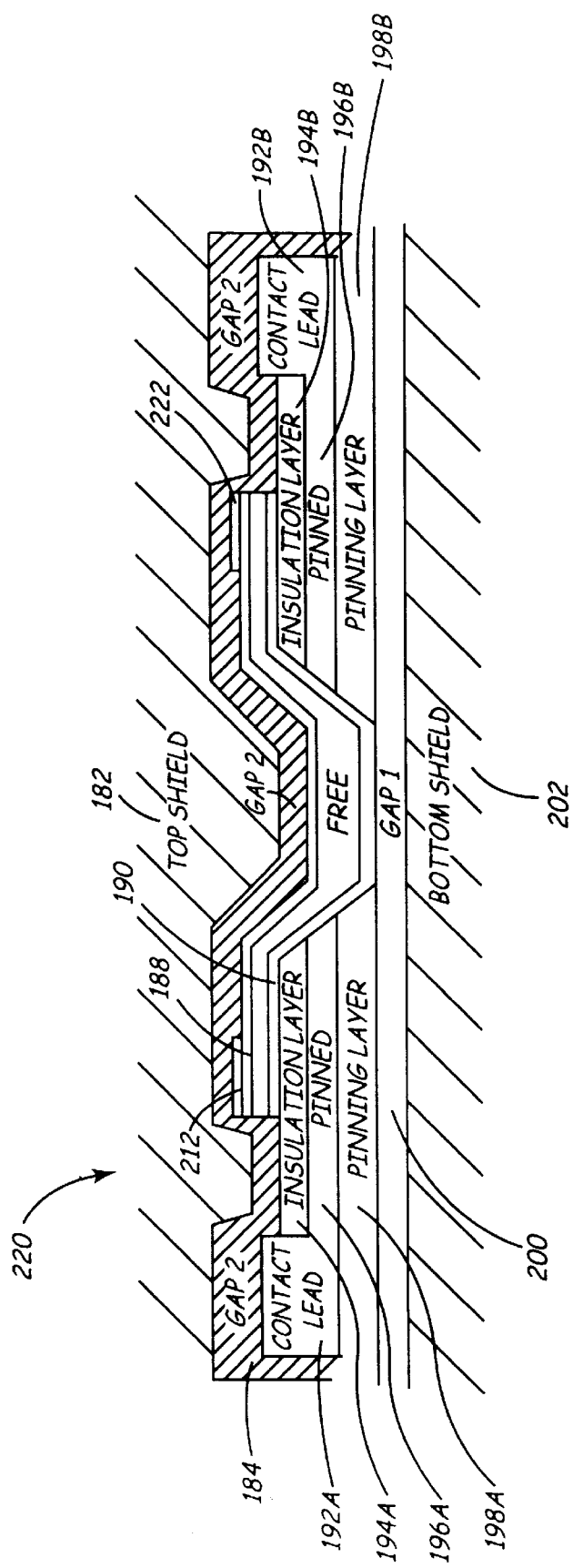
FIG. 7 shows a planar double spin valve head according to the present invention, with a free layer stabilization layer.

FIG. 7 shows a planar double spin valve head according to the present invention, with a stabilization layer for stabilizing the free layer. Spin valve head 220 is substantially the same as spin valve head 210 shown in FIG. 6, but further includes stabilization layer 222 formed on current compensation layer 212. Stabilization layer 222 is preferably formed of an antiferromagnetic material, such as IrMn, PtMn, or NiMn, exchange coupled to free layer 188. The sensitivity of free layer 188 can be controlled by varying the thickness of layers 188, 212 and 222 and the types of materials used for these layers.

Although the present invention has been described with reference to preferred embodiments, workers skilled in the art will recognize that changes may be made in form and detail without departing from the spirit and scope of the invention.

What is claimed is:

1. A planar spin valve read head comprising:
   a top and a bottom shield, and a first and a second gap layer, the first gap layer positioned adjacent to the bottom shield, the second gap layer positioned adjacent to the top shield; and
   a first and a second planar spin valve sharing a common free layer and positioned between the first and the second gap layers, wherein the first planar spin valve includes a first spacer layer portion, the second planar spin valve includes a second spacer layer portion, and wherein the first and the second spacer layer portions are formed on the first gap layer and positioned substantially vertical to the first gap layer.

2. The planar spin valve read head of claim 1, wherein the common free layer is formed over the first gap and is positioned at least in part between the first and the second spacer layer portions.

3. The planar spin valve read head of claim 1, wherein the common free layer comprises first and second outer regions separated by a central active region, and wherein a first stabilization layer is formed over the first outer region, and a second stabilization layer is formed over the second outer region.

4. The planar spin valve read head of claim 3, wherein the first and the second stabilization layers are an antiferromagnetic material.

5. The planar spin valve read head of claim 3, wherein the first and the second stabilization layers are permanent magnets.

6. The planar spin valve read head of claim 1, and further comprising a current compensation layer formed on the common free layer.

7. The planar spin valve read head of claim 6, wherein the current compensation layer is Cu.

8. The planar spin valve read head of claim 6, and further comprising a free layer stabilization layer formed on the current compensation layer.

9. The planar spin valve read head of claim 8, wherein the free layer stabilization layer is an antiferromagnetic material.

10. The planar spin valve read head of claim 1, wherein the spacing between the top and the bottom shields is less than about 450 angstroms.

11. A planar double spin valve sensor comprising:
    a first gap layer having a central region positioned between first and second outer regions;
    a first and a second pinned layer, the first pinned layer formed over the first outer region of the first gap layer, the second pinned layer formed over the second outer region of the first gap layer;
    a spacer layer having a first portion formed on the central region of the first gap layer, the spacer layer having at least one second portion formed substantially perpendicular to the first gap layer; and
    a free layer positioned at least in part over the first portion of the spacer layer and between the first and the second pinned layers.

12. The spin valve sensor of claim 11, and further comprising a first and a second insulation layer; the first insulation layer formed over the first pinned layer, the second insulation layer formed over the second pinned layer.

13. The spin valve sensor of claim 12, wherein the spacer layer includes first and second outer regions, the first outer region of the spacer layer formed at least in part over the first insulation layer, the second outer region of the spacer layer formed at least in part over the second insulation layer.

14. The spin valve sensor of claim 13, wherein the free layer includes first and second outer regions, the first outer region of the free layer formed over the first outer region of the spacer layer, the second outer region of the free layer formed over the second outer region of the spacer layer.

15. The spin valve sensor of claim 11, and further comprising a current compensation layer formed on the free layer, the current compensation layer formed of the same material as the spacer layer.

16. The spin valve sensor of claim 15, and further comprising an antiferromagnetic stabilization layer formed over substantially an entire top surface of the current compensation layer.

17. A planar double spin valve sensor comprising:
    a first gap layer having a central region positioned between first and second outer regions;
    a first and a second pinning layer, the first pinning layer formed over the first outer region of the first gap layer, the second pinning layer formed over the second outer region of the first gap layer;

a first and a second pinned layer, the first pinned layer formed over the first pinning layer, the second pinned layer formed over the second pinning layer;

a spacer layer having a central region formed on the central region of the first gap layer, a first portion formed substantially perpendicular to the first gap layer and adjacent to the first pinned layer, and a second portion formed substantially perpendicular to the first gap layer and adjacent to the second pinned layer; and a free layer having a central region formed on the central region of the spacer layer, a first portion formed on the first portion of the spacer layer, and a second portion formed on the second portion of the spacer layer.

18. The spin valve sensor of claim 17, and further comprising a first and a second insulation layer, the first insulation layer formed over the first pinned layer, the second insulation layer formed over the second pinned layer.

19. The spin valve sensor of claim 18, wherein the spacer layer includes first and second outer regions, the first outer region of the spacer layer formed at least in part over the first insulation layer, the second outer region of the spacer layer formed at least in part over the second insulation layer.

20. The spin valve sensor of claim 19, wherein the free layer includes first and second outer regions, the first outer region of the free layer formed over the first outer region of the spacer layer, the second outer region of the free layer formed over the second outer region of the spacer layer.

21. The spin valve sensor of claim 17, and further comprising a current compensation layer formed on the free layer, the current compensation layer formed of the same material as the spacer layer.

22. The spin valve sensor of claim 21, and further comprising an antiferromagnetic stabilization layer formed over substantially an entire top surface of the current compensation layer.

* * * * *